June 14, 1966 H. EBERT 3,255,589
HYDROSTATIC FLUID TRANSMISSION
Filed Feb. 24, 1965 6 Sheets-Sheet 1

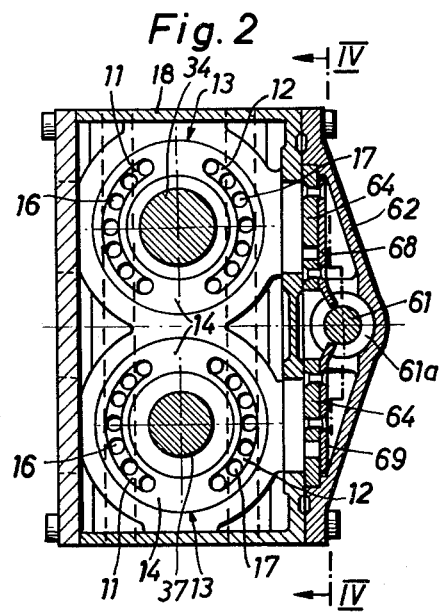
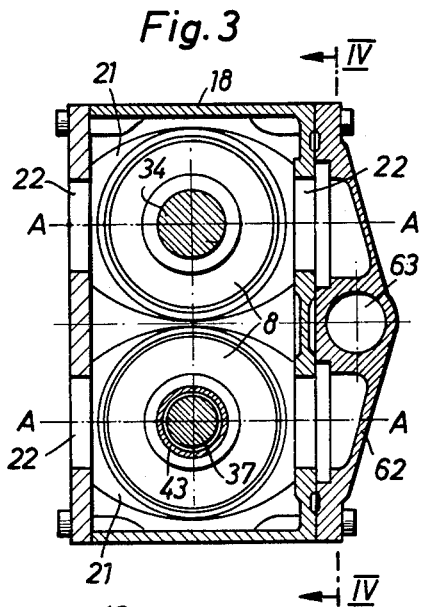
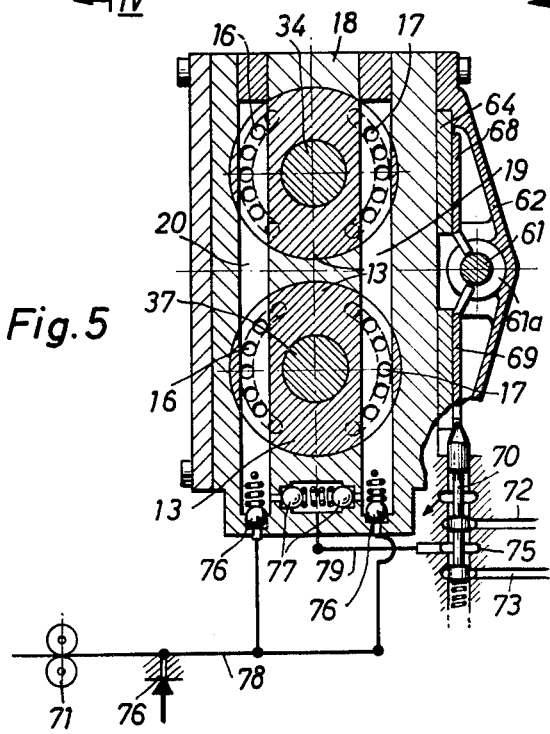

June 14, 1966  H. EBERT  3,255,589
HYDROSTATIC FLUID TRANSMISSION

Filed Feb. 24, 1965  6 Sheets-Sheet 3

June 14, 1966    H. EBERT    3,255,589
HYDROSTATIC FLUID TRANSMISSION
Filed Feb. 24, 1965    6 Sheets-Sheet 4
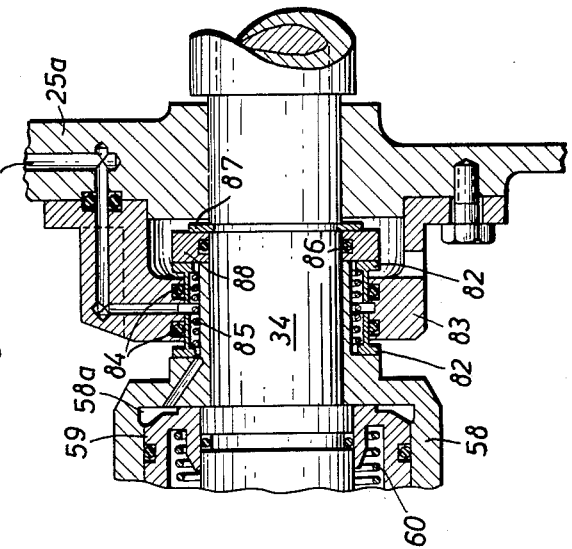
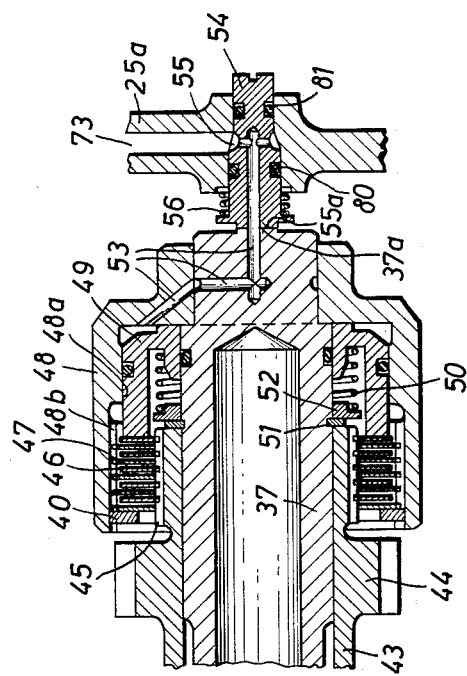

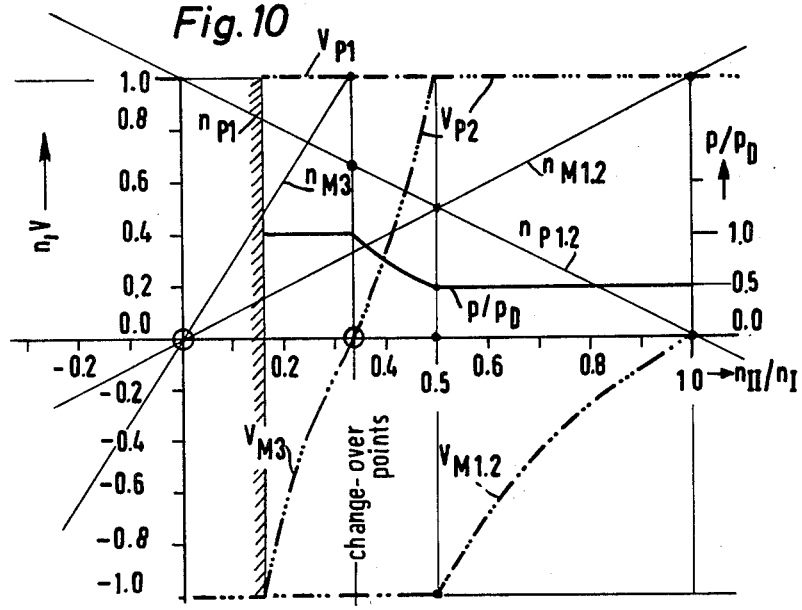
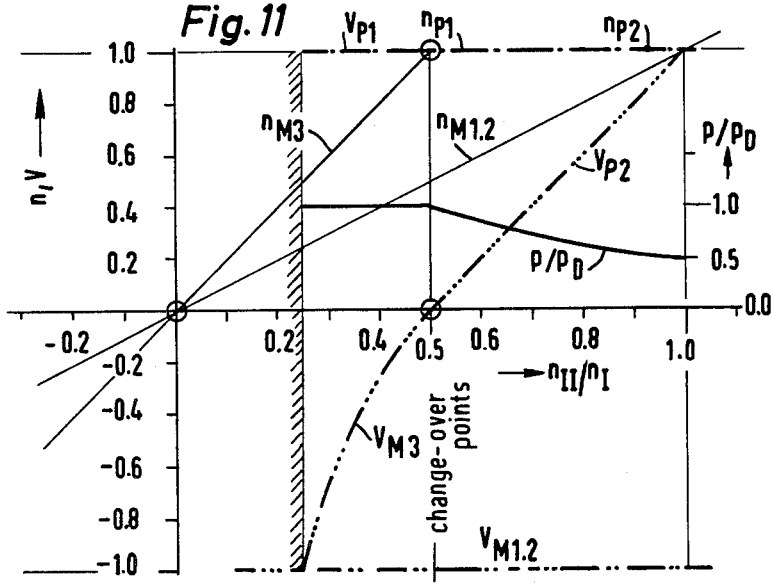

United States Patent Office 3,255,589
Patented June 14, 1966

3,255,589
HYDROSTATIC FLUID TRANSMISSION
Heinrich Ebert, Im Weller 2, Furth, Bavaria, Germany
Filed Feb. 24, 1965, Ser. No. 434,932
Claims priority, application Germany, Feb. 25, 1964, E 26,487
15 Claims. (Cl. 60—53)

The present invention relates to an infinitely variable hydrostatic fluid transmission, especially for but not limited to vehicles in which preferably the fluid motor part is divided up into a plurality of hydrostatic displacement units for reducing the dimensions and the weight of the transmission.

These motor units, within the range of high torque conversion together act upon a transmission output shaft common thereto, whereas within the range of low torque conversion, at least one of said motor units is, after adjustment to absorption volume zero, disconnected from the output shaft and kept at a standstill in order to reduce transmission losses.

It is an object of this invention to provide a hydrostatic fluid transmission which will make it possible for transmitting a certain power still further to reduce the dimensions and weight of a transmission of the type involved.

It is also an object of this invention to provide a transmission as set forth above which will permit obtaining a minimum speed ratio between output shaft and input shaft of for instance 0.25 without the necessity of increasing the pressure ratio beyond 1.

These and other objects and advantages of the invention will appear more clearly from the following specification in connection with the accompanying drawings, in which:

FIG. 2 represents a section along the line II—II of FIG. 1.

FIG. 3 is a section along the line III—III of FIG. 1.

FIG. 5 is a section along the line V—V of FIG. 1 and diagrammatically indicates an arrangement for increasing the pressure of the oil controlled by a hydraulic control member for actuating the hydraulic disc clutches of FIG. 1.

FIG. 6 illustrates on a somewhat larger scale an arrangement according to the present invention for actuating a clutch on the pump shaft according to FIG. 1, said arrangement representing an oil transmission arrangement particularly well suitable for operation by high pressure.

FIG. 7 illustrates on a larger scale an oil conveying arrangement operable by high pressure for actuating the clutch on the output shaft of FIG. 1.

FIG. 8 represents a modified purely hydraulically operable transmission, in which the engagement and disengagement of the hydraulic unit with regard to the transmission output shaft and also with regard to the pump shaft is effected purely mechanically by sleeve clutches, and, more specifically, in conformity with the speed ratios of the shafts to be engaged and disengaged.

FIG. 9 illustrates a section through the mechanical clutch mechanism of FIG. 8, said section being taken along the line IX—IX of FIG. 8.

FIG. 10 is a graph showing the speed, the delivery and absorption volumina of the various hydrostatic units and the pressure ratios $p/p_D$ of the transmission fluid for the transmission of FIG. 1 plotted over the speed ratio of transmission output speed $n_{II}$ to transmission input speed $n_I$.

Figure 1:
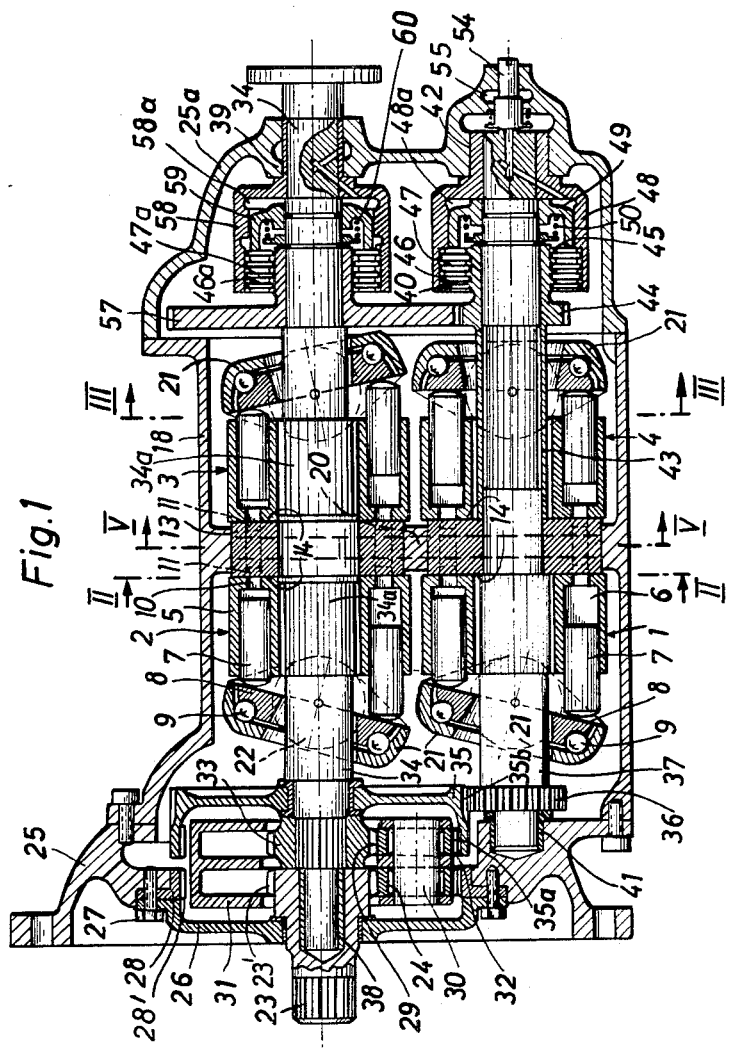
FIG. 1 illustrates a transmission according to the present invention with power output split, in which the engagement and disengagement of the hydrostatic unit with regard to the output shaft and also with regard to the pump driving shaft is adapted to be effected by hydraulically operable disc clutch means by means of a control member operable by a stroke volume control mechanism.

FIG. 11 graphically illustrates the data of operation as in FIG. 10 but for a transmission according to FIG. 8.

GENERAL ARRANGEMENT

In order to reduce transmissions of the above identified general type with regard to dimensions and weight, according to the present invention it is suggested not to allow that motor unit which when adjusted for the absorption volume zero to sit still and unused after it is disengaged. Instead, according to the present invention, the said disengaged motor unit is used as additional pump unit within the speed ratio of the transmission output speed $n_{II}$ to the transmission input speed $n_I$ in the direction toward the ratio of 1:1, i.e. within the ratio of low torque conversion. To this end, according to the present invention, the said disengaged motor unit is, following its disengagement from the transmission output shaft, connected to the driving shaft of the already present pump unit and while increasing its delivery volume toward 1:1 is employed more and more as pump unit, and vice versa. In this way, one and the same transmission output is within the speed ratio range toward $n_{II}/n_I=1.0$ with regard to conditions within the range of higher torque conversion transmitted at correspondingly low pressure of the transmission fluid.

Inasmuch as the range toward 1:1, i.e. the range of lower torque conversion, with vehicle drives generally represents the main condition of operation, and the range of higher torque conversion occurs only for a considerably shorter period of time, the pressure of the transmission fluid, which pressure forms the basis for the dimensioning of the individual units to be selected correspondingly higher with regard to the pressure forming the basis for the dimensioning of the units when a unit is merely disengaged and then left idle, while the same life of the elements of the unit as for instance the piston loaded bearings will be assured. In this way, smaller and lighter units will be obtained.

In connection with the above and keeping in mind the fact that smaller units can also rotate at increased speeds, it will be appreciated that for purposes of transmitting the same output at the same maximum torque conversion, the present invention will result in a transmission which is considerably smaller and lighter than heretofore customary transmissions as will more clearly become evident from the following considerations. The transmission of a certain output N may with regard to longitudinal measurements L of a unit and the pressure $b_D$ of the transmission fluid as selected for said dimensions be expressed by the equation $N = cp_D L^2$, in which $c$ represents a constant. Thus, when an output N is transmitted by a transmission $a$ having the longitudinal dimensions $L_a$ at a transmission fluid pressure $p_{Da}$, the longitudinal dimensions $L_b$ for a transmission $b$ which is intended to transmit the same output N but in which $p_{Db}$ represents the basic pressure for the dimensions $L_b$, can be ascertained from the following equation:

$$p_{Db}L_b^2 = p_{Da}L_a^2 \text{ to } L_b = (p_{Da}/p_{Db})^{1/2}L_a$$

The respective weights G of these units, as well as the weight of the entire transmission are, as is well known, proportional to $L^3$. Consequently, the weight of the transmission $b$ with regard to the weight of the transmission $a$ may be expressed by:

$$G_b = G_a(p_{Da}/p_{Db})^{3/2}$$

With regard to $p_{Db}/p_{Da}$, the following ratios will be obtained:

| $p_{Db}/p_{Da}$ = | 1.000 | 1.100 | 1.200 | 1.300 | 1.400 | 1.500 | 1.600 |
|---|---|---|---|---|---|---|---|
| $L_b/L_a$ = | 1.000 | 0.956 | 0.920 | 0.885 | 0.845 | 0.824 | 0.793 |
| $G_b/G_a$ = | 1.000 | 0.880 | 0.780 | 0.700 | 0.610 | 0.560 | 0.500 |

From the above, it will be evident that when increasing the pressure $p_D$ on which the respective dimensions have been based, for instance to $p_{Db}=1.6p_{Da}$, for $L_b/L_a=0.800$ and for $G_b/G_a=0.500$ there will be obtained values which can easily be realized.

For a better understanding of the present invention, the same will now be explained in connection with two embodiments of the invention. With these embodiments exclusively, units of the axial piston design will be employed which in conformity with U.S. Patent 3,123,975 are all arranged on a fluid distributor or transmitter common to all of said units. Such arrangements will in connection with the present invention yield particularly favorable designs. However, it is expressly to be understood that the present invention is not limited to these specific constructions but that instead of the illustrated units according to the axial piston type, also units may be employed of any other design.

STRUCTURAL ARRANGEMENT

*Embodiment of FIGS. 1 to 7.*—Referring now to the drawings in detail and FIGS. 1 to 7 thereof in particular, the hydrostatic portion of the transmission comprises four hydrostatic axial piston units 1, 2, 3 and 4 of which unit 1 represents the pump unit $P_1$ while the units 2 and 3 represent the motor units $M_1$ and $M_2$. Unit 4, which may be termed "selective unit" is adapted selectively to be used as a pump unit $P_2$ or as motor unit $M_3$.

Each of the above-mentioned units substantially comprises a cylinder drum 5 having a plurality of cylinders 6 uniformly distributed around the drum axis. In each of said cylinders 6 there is reciprocably mounted an axially displaceable piston 7. Pistons 7 are by pressure fluid pressed against a pressure disc 8—one pressure disc 8 for each unit—said pressure disc being rotatably journalled by means of bearings 9. Each drum wall closing the cylinders has passages 10 therein through which the interior of said cylinders communicates with kidney-shaped openings or passages 11 and 12 of control valves 13.

Control valves 13 which have an outer cylindrical surface are respectively arranged between two axially aligned cylinder drums and are at both sides provided with passages 11 and 12 as well as with sealing surfaces 14. Those passages 11, 12 which in axial direction are located opposite to each other communicate with each other through bores 16 and 17.

Control valves 13 are pressed into a wall of a transmission housing 18 which is provided with bores or conduits 19, 20 extending over the pressed-in control valves 13 in such a way that through the intervention of the latter, bores 16 and 17 and those passages 11 and 12 of the two control valves are in hydraulic communications with each other. Thus cylinders 6 of each unit located in front of the respective drawing plane, and also cylinders 6 located behind the drawing plane are hydraulically interconnected so that when said cylinders 6 rotate relative to control valves 13 they will alternately communicate with the high pressure conduit 19 and the low pressure conduit 20. The pressure discs 8 of the transmission according to FIG. 1 are respectively rotatably journalled in tilting housings 21 each of which is at opposite sides thereof provided with pinions 22 tiltably journalled in the transmission housing so that pressure discs 8 are tiltable relative to transmission housing 18 about the axes A—A.

The drive of the transmission according to FIG. 1 is effected by drive shaft 23 provided with a central toothed portion 23' serving as sun gear and in meshing engagement with planetary gears 24. Planetary gears 24 mesh with teeth 28' of a gear ring or wheel 28 which latter together with transmission cover 26 is connected to transmission housing 25 by bolts 27. The arrangement comprises additional planetary gears 29 which are rotatably journalled on pivots 30 of the double planetary gear carrier 31 in a manner similar to the planetary gears 24. Planetary gears 29 of said second planetary gear transmission, the planetary gear carrier of which forms a single piece with the planetary gear carrier for the first planetary gear transmission, mesh with a sun gear 33 keyed to a transmission output shaft 34. Planetary gears 29 mesh with teeth 35$a$ formed on wheel 35 which in its turn is rotatably mounted on transmission output shaft 34 and at the same time meshes by means of its outer teeth 35$b$ with a pinion 36 of a driving shaft 37 for the pump unit.

As will be evident from the above, the first planetary gear transmission merely drives the planetary gear carrier 31 of the first as well as of the second planetary gear transmission. In contrast thereto, the second planetary gear transmission with the planetary gears 29 represents a transmission with differential effect. More specifically, when output shaft 34 is at a standstill, pump driving shaft 37 will rotate generally at the same speed as the input shaft, whereas at the same speed of the output shaft 34 and the transmission input shaft 23, pump shaft 37 will be at a standstill. The effect of this differential transmission therefore is such that at least within the mentioned range, the sum of both speeds will always equal the speed of the input shaft. In this connection it will be noted that independently of the transmission output speed, always a torque $M_{II}$ of the same magnitude as that of torque $M_I$ exerted upon the input shaft will act upon the output shaft so that the power purely mechanically conveyed from the input shaft upon the output shaft will be proportional to the driving torque $M_I$ times the output speed $n_{II}$, i.e. proportional $M_I n_{II}$.

Inasmuch as the input power in its entirety is proportional to the input torque $M_I$ times the input speed $n_I$, i.e., $M_I n_I$, merely always only the portion $M_I n_{II}$ is conveyed purely mechanically from the input shaft to the output shaft, whereas the remainder of the magnitude $M_I(n_I - n_{II})$ has to be transmitted through the hydrostatic portion of the transmission.

It will thus be evident that the entire input power is transmitted from the input shaft by means of the differential transmission in a power branching manner, i.e., in part through a mechanical branch and in part through a hydrostatic branch to the transmission output shaft while the hydrostatic part brings about the increase of the driving moment $M_I$ to the output torque $M_{II}$, in other words the increase in the torque $M_{II} - M_I$.

If in this connection $n_{II}$ equals $n_I$, the entire power is transmitted mechanically only while the power transmitted by the hydrostatic part is zero. This applies when the pressure discs of all motor units have been so adjusted that the stroke volume of these units totals zero.

Output shaft 34 is at one end rotatably journalled in bearing 38 of the input shaft 23, whereas the other end of output shaft 34 is journalled in bearing 39 supported by housing 25$a$.

Output shaft 23 is at both sides of control valve 13 provided with splined sections 34$a$ having keyed thereto cylinder drums 5 of motor units 2 and 3.

Pump shaft 37 driven through the intervention of pinion 36 is rotatably journalled in bearings 41 and 42. Between the pinion 36 and control valve 13, pump shaft 37 has keyed thereto the cylinder drum of pump unit 1. Between control valve 13 and bearing 42 there is rotatably journalled a hollow shaft 43 of a shiftable selective unit 4.

The disengagement and engagement of the selective unit 4 with pump drive shaft 37 may be effected automatically by any desired member of the control mechanism for adjusting the feeding or absorption volume and may be so controlled that the said member in conformity with German Patent 1,065,734 actuates a shiftable member which in this instance effects a coupling between the unit to be coupled and the output shaft while at the same time the clutch between the unit adapted to be coupled and the pump driving shaft is disengaged. This shiftable member is also adapted in the reverse instance to disengage the unit adapted to be coupled from the output shaft and at the same time to effect engagement between the unit to be coupled and the pump driving shaft. The said shiftable member may be designed as a hydraulic control valve, especially when the clutches are designed as disc clutches adapted to be actuated by a hydraulic piston. The oil pressure required for this purpose is generally withdrawn from a low pressure oil source, for instance a gear pump, and by a control valve is conveyed to one or another hydraulically operable piston.

In order to be able to design these disc clutches together with the hydraulic pistons as small and light as possible, according to a further development of the present invention, the oil pressure of the oil pump which is relatively low is transformed to high pressure by conveying the low pressure oil delivered by the pump through ball check valves to the respective low pressure side of the transmission oil system while the gear pump acts simultaneously as filling and pre-pressure developing pump for this system. The oil will only then be withdrawn from the respective high pressure side of the oil system and conveyed to the control valve.

With reference to FIGS. 1 and 6, it will be noted that hollow shaft 43 has fixedly connected thereto a gear 44 and clutch teeth 45. Loosely mounted on clutch teeth 45 are clutch discs 46 which cooperate with clutch discs 47. Clutch discs 47 are loosely inserted into clutch teeth 48b of a clutch member 48 pressed upon pump shaft 37. Said clutch discs 47 are adapted to engage a spring ring 40 forming an axial pressing ring. This clutch part is furthermore provided with a cylinder 48a having axially displaceably mounted therein an annular piston 49. Piston 49 is adapted when being subjected to oil under pressure to be pressed against discs 46, 47 so that they will effect coupling engagement between hollow shaft 43 and pump shaft 37. When no oil pressure is effective, annular piston 49 will by means of a spring 50 be pressed into the disengaged position shown in FIG. 6. Piston 50 rests against pump shaft 37 through the intervention of a disc 52 held by spring ring 51. The oil under pressure for effecting a clutch engagement is conveyed to cylinder 48a through bores 53 by means of a small axially displaceable and centrally arranged stepped piston 54 and, more specifically, from annular groove 55 in the housing through self-sealing surfaces 55a, 37a. For initiating the self-sealing when no oil under pressure is available there is provided a spring 56 which presses stepped piston 54 against end faces 37a of pump shaft 37.

Gear 44 of hollow shaft 43 meshes with a gear 57. The ratio of the number of teeth of gear 57 to the number of teeth of gear 44 is in this instance 3:1. Gear 57 is rotatably journalled on output shaft 34. Gear 57 is similar to hollow shaft 43 provided with clutch teeth which are arranged coaxially with regard to the axis of the output shaft.

Loosely mounted on said clutch teeth are clutch discs 46a which cooperate with clutch discs 47a. Clutch discs 47a are loosely slipped onto the clutch teeth of clutch member 58 pressed upon the output shaft and adapted to engage a ring similar to ring 40 in FIG. 6.

Clutch member 58 (FIG. 7) also in this instance comprises a cylinder 58a in which there is reciprocably mounted an annular piston 59. When piston 59 is subjected to oil under pressure, it is pressed against the clutch discs so that gear 57 will be drivingly connected to output shaft 34 or unit 4 will, through gears 44, 57 be drivingly connected to output shaft 34. When the oil pressure subsides or no oil pressure is present, annular piston 59 is by means of a spring 60 resting against output shaft 34 pressed into a disengaging position.

Figure 4:
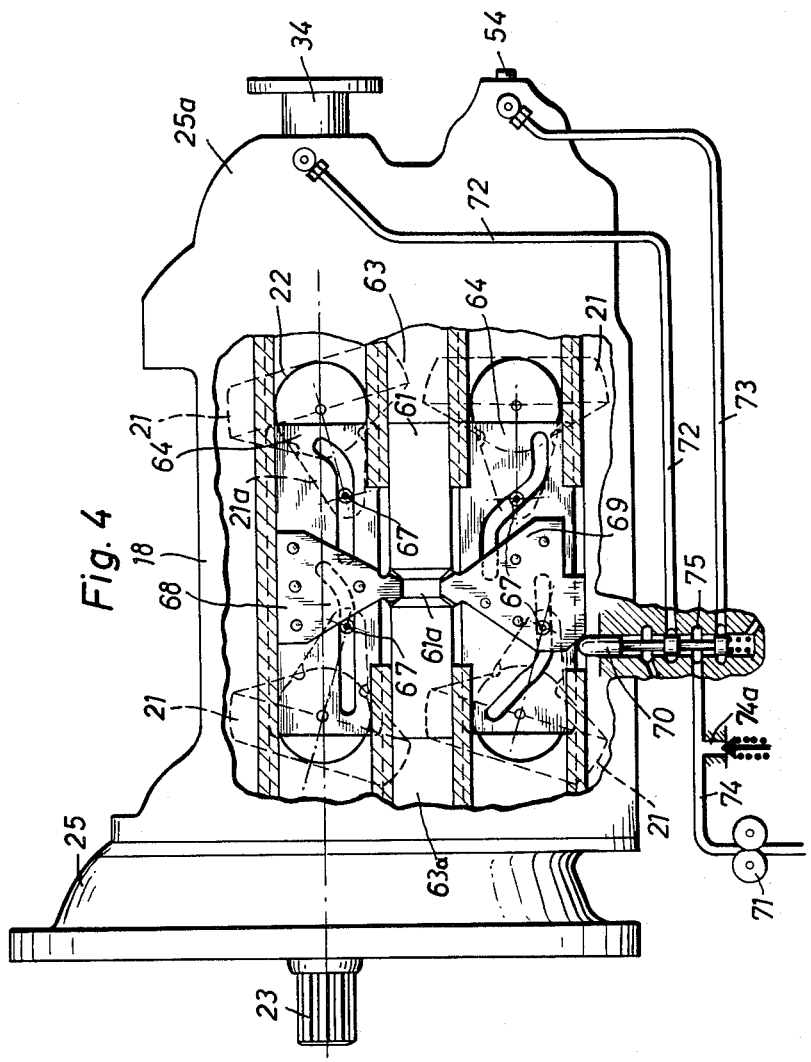
FIG. 4 illustrates partly in section and partly in view the stroke volume control mechanism of the transmission of FIG. 1 as seen from the section line IV—IV of FIGS. 2 and 3, FIG. 4 also diagrammatically showing the hydraulic control member for actuating the hydraulic clutches of this design.

The adjustment of the speed ratio of output speed $n_{II}$ to input speed $n_I$ is effected by stroke adjusting piston 61 (FIGS. 2 and 4). Piston 61 is axially displaceable in a cylinder 63, 63a which is provided in a cover 62 screwed onto the transmission housing and is operable by oil under pressure which is adapted to be controlled by a valve (not shown).

Between cover 62 and the transmission housing proper 18 there are provided slide members 64 which are displaceable parallel to each other in axial direction. Said sliding members have curved milled-out sections engaged by rollers 67 the axles or bolts of which are connected to lever arms 21a of the individual tilting housings 21. Riveted to each sliding member 64 is a sheet metal flap 68, 69 which is so shaped as to be adapted to engage an annular groove 61a of stroke adjusting piston 61, so that in response to a displacement of piston 61, the two sliding members 64 will be displaced. In this way, the tilting housings 21 of the individual hydrostatic units 1-4 are tilted in conformity with a certain program so that the stroke volumina thereof will be changed and consequently any desired speed ratio can be brought about in an infinitely variable manner.

FIG. 4 shows a position in which the tilting housing of unit 4 occupies its zero stroke position, which means it is in the position where a shift-over is to to be effected. Also actuating valve 70 for the hydraulically operable clutches is in its shift-over position, said valve being controlled by a cam at the lower end of the lower flap 69 in FIG. 4. When valve 70 is moved upwardly from the illustrated position, which movement would occur when slide member 64 moves toward the right, valve 70 will occupy a position in which the oil of pressure source 71 is conveyed through conduit 72 to cylinder 58a of the clutch on output shaft 34, whereas conduit 73 will be pressureless, said conduit 73 leading to a cylinder 48a of the clutch on pump shaft 37. In this instance, unit 4 will operate as motor and consequently is disengaged from pump shaft 37 while being connected to output shaft 34 through gears 44, 57.

When valve 70 is moved downwardly from its illustrated position, which downward movement occurs when slide member 64 moves from its illustrated position toward the left, the oil of the pressure source 71 is passed through conduit 73 to cylinder 48a of the clutch on pump shaft 37, whereas conduit 72 becomes pressureless, conduit 72 leading to cylinder 58a of the clutch on output shaft 34. In this instance, unit 4 will operate as pump and consequently is clutched to the pump shaft 37 while disengaged from output shaft 34.

With the hydraulic clutch actuating mechanism of FIG. 4, pressure source 71 has been diagrammatically illustrated as gear pump which normally is driven by the transmission input shaft. The oil delivered by said gear pump and required for the coupling operation is pressed through conduit 74 into chamber 75 of clutch actuating valve 70 while the excessive oil is permitted to escape through the diagrammatically illustrated pressure holding valve 74a. In this connection, it should be noted that the liquid pressure must, of course, not be such as to represent a relatively low pressure which, in particular for the transmission of higher torques, requires relatively large cylinders and pistons for the clutches. In order to be able to realize smaller disc clutches and pistons therefore, an arrangement according to FIG. 5 is suggested. According to this arrangement, the oil delivered by pump 71 is not directly conveyed to the clutch actuating valve 70 but is passed via the low pressure side to the high pressure side of the hydraulic transmission part. To this end, ball check valves 76 and 77 (FIG. 5) have been provided. It will thus be evident that the oil delivered by pump 71 through conduit 78 is adapted to flow through one of the valves 76 only to the respective temporary low pressure side of the hydraulic transmission, whereas the other valve 76 inversely prevents a return flow from the respective high pressure side of the transmission into conduit 78. Through valve 77 on the other hand, the oil is adapted to pass from the respective high pressure side to conduit 79 and thus to chamber 75 of the clutch actuating valve 70. From here the oil passes as before, depending on its position, into conduit 72 or 73 which is identical with conduits 72 and 73 in FIG. 4.

Inasmuch as the maximum torque to be conveyed by the clutch discs will occur only with the maximum absorption or delivery volume of the respective unit and thus is proportional to this high pressure, very favorable conditions will be realized with regard to the dimensioning of the clutch actuating piston and with regard to the dimensioning of the clutch discs.

The coupling operation of the shiftable or selective unit occurs only when the absorption or delivery volume is zero, while the drum of said shiftable unit without a higher torque has to be nearly synchronized, which means it has to be speeded up more or less alone. As a result thereof, at the first instant of the coupling operation, only a relatively low pressure is to be exerted upon the clutch discs sliding upon each other and only a minor heat development will occur, so that in addition to the hydraulic pistons, also clutch discs can be designed with small dimensions. This is all the more the case because the full torque of the shiftable unit can occur always only after the synchronizing operation has been completed. The clutch discs can thus, for purposes of conveying the full torque, be dimensioned for a high specific pressure, so that they can be correspondingly small.

For purposes of conveying the high pressure from the stationary parts to the rotating shafts of the clutch piston cylinders, special sealing elements are suggested which make possible the transmission of oil under high pressure to the rotating parts without any material friction losses. It will be understood that instead of the hydraulically operable disc clutches, also hydraulically operable jaw clutches may be provided, if desired, in cooperation with synchronizing means well known per se.

In order to realize an as friction-free transmission as possible of the high pressure oil from the stationary conduits 72, 73 to the annular piston cylinders 48a, 58a which rotate together with shafts 34, 37, the present invention provides conveying arrangements with special sealing elements shown in FIGS. 6 and 7. The sealing elements employed in the arrangements of FIGS. 6 and 7 are characterized primarily by sealing surfaces the specific medium surface pressure of which is less than the pressure of the oil which is to be conveyed from the stationary part to the rotating shafts.

The respective elements according to the arrangement of FIG. 7 which is suitable for all shafts in which the transmission may be effected centrally, as with pump shaft 37, have already been described above. In this connection, there remains merely to point out that due to the central oil transmisison, particularly low friction losses are encountered, especially when the annular sealing surfaces 55a, 37a of this arrangement are dimensioned so great that the numerical value thereof amounts to about 1.6 of the annular surface of the stepped piston when said surface is subjected to full pressure. The said annular surface represents the difference between the surface of the larger diameter and the surface of the smaller diameter of stepped piston 54. The said surfaces are sealed relative to the housing bores by rubber rings 80, 81. Thus, for the sealing surfaces 55a and 37a a medium specific pressure is obtained which has the same realtionship to the full pressure of the coupling fluid as the pressure acting on the sealing surface of cylinder drum 5 to the working pressure of the transmission oil, so that a rotative movement between said sealing surfaces is possible with very low friction losses.

In contrast to the embodiment of FIG. 6, the arrangement of FIG. 7 is particularly suitable for the transmission of oil to continuous shaft as, for instance shaft 34. In this instance, stepped piston 54 and its sealing surface have been replaced by two sealing rings 82 which are arranged coaxially, for instance with regard to the axis of the rotating output shaft 34 and are located in a bore of a part 83 screwed onto transmission housing 25a. The said sealing rings 82 are arranged axially within rubber rings 84 and are arranged so as to form an image to each other. Both sealing surfaces of said sealing rings 82 are by springs 85 arranged therein pressed slightly against their respective countersealing surfaces on clutch member 58 and on sealing ring 88 which by means of rubber ring 86 is sealed relative to shaft 34 and is axially held by a snap ring 87. In this way an initial self-sealing will be effected. The said sealing surfaces are with regard to their size so dimensioned that they are about 1.6 times greater than the sealing surfaces of said sealing rings, which sealing surfaces are axially acted upon by the full oil pressure. In this way, as before, a smaller medium specific pressure relative to the full oil pressure is obtained whereby considerably lower friction losses are encountered over ordinary sealing rings.

*Embodiment of FIG. 8.*—Instead of the clutch devices controlled by members of the adjusting arrangement for the circulating volume, according to the pressure invention also clutch means may be employed which operate independently of the adjusting device for the circulating volume. Such an arrangement is illustrated in FIG. 8, in which those elements corresponding to the embodiment of FIGS. 1 to 7 have been designated with the same reference numerals as in said figures but elevated by 100. According to the arrangement of FIG. 1, the drive shaft 143 of the unit 104 adapted to be disengaged is provided with clutch teeth 144a on which there is provided a first clutch sleeve 165 displaceable in axial direction. This first clutch sleeve 165 is adapted to be brought into engagement with corresponding clutch teeth 150 of the extended pump driving shaft 137 so that both driving shafts can be coupled to each other.

Similarly, a gear 157 which is driven by a gear 144 of drive shaft 143 of unit 104 adapted to be coupled is rotatably mounted on transmission output shaft 134 and is provided with clutch teeth 145 on which a second coupling sleeve 165 is arranged which is likewise displaceable in axial direction. This second clutch sleeve 165 is adapted to be moved into corresponding clutch teeth 158 of the transmission output shaft 134 whereby drive shaft 143 of unit 104 is adapted through the two gears 144, 157 and the two sets of clutch teeth, to be coupled with the transmission output shaft 134.

The first and second clutch sleeves are each provided, for instance with an annular groove 165a adapted to be engaged by corresponding pivots 166 of a transverse lever 167 which is tiltably journalled on transmission housing 125a and kinematically interconnects the two rotating clutch sleeves 165 in such a way that when one sleeve is in engaged position, the other sleeve will be in its disengaged position, whereas in an intermediate position between the said two extreme positions, the shafts are disengaged with regard to each other.

If one sleeve is, beyond said intermediate position moved in one or the other direction, that sleeve which is closest to its respective clutch position will, by means of a snap spring 169 adapted to act upon the transverse lever 167 with its dead center in central position, furthermore be moved into the respective engaged position.

The displacement of the respective disengaged sleeve up to and slightly beyond the respective intermediate position is in conformity with the present invention, in this instance effected by means of a threaded member 153, 163 which pertains to the respective coupling sleeve and in disengaged position is rotatably connected to said sleeve while being held by a spring in this position, said threaded member cooperating with a threaded bushing having a steep pitch and rotating with the threaded member in engaged position. The threaded bushings 151, 159 respectively pertaining to said clutch sleeves 165 are centrically but axially non-displaceable with regard to the respective shaft 134, 137 to be engaged and are rotatable relative thereto only as long as the respective sleeve 165, which is in disengaged position, is slower than the rotative speed of the shaft to be engaged. The steep pitch threads on bushing 151 are shown in elevation at 151a. The threads on bushing 159 are of the same type.

If, however, the respective sleeve 165, which is in disengaged position, tends to rotate at a higher speed than the shaft to be engaged, the threaded bushing is held fast with regard to shaft 137, 134 by a free-wheel drive 152, 160 between the respective threaded bushing 151, 159 and shaft 134, 137 concentric thereto, so that the threaded bushing will turn with said shaft. As a result thereof, the threaded member 153, 163 which in this position is rotatably connected to clutch sleeve 165, will be rotated relative to the threaded bushing 151, 159 while simultaneously therewith clutch sleeve 165 is moved beyond the above-mentioned intermediate position. In this connection, it is to be noted that at the same time the second clutch sleeve will, through transverse lever 167 be moved into disengaged position, said second clutch sleeve being in engaging position with regard to the other shaft.

Finally, coupling sleeve 165 moved beyond its intermediate position is by means of a spring 169 acting upon transverse lever 167 pressed completely into engaging position with regard to the shaft to be engaged. This is possible without difficulty inasmuch as the respective engageable unit rotates with the stroke volume zero, in other words, does not exert a torque, and after complete disengagement with regard to the other shaft, i.e. when it is ready to be connected with the other shaft, synchronism of the parts to be coupled to each other will occur in view of the reduction of the previously increased sleeve speed due to the friction on the rotatable parts of the shiftable unit.

The threaded member 153, 163 which, following the above steps is no longer rotatably connected to the coupling sleeve, is finally pressed back into its abutment fixed starting position, so that during a later coupling operation the same starting condition in disconnecting position, will be available.

This arrangement thus yields a mutual automatic engaging and disengaging operation and, more specifically, independently of a control member which is actuated by the stroke volume adjusting mechanism, or, expressed differently, solely in conformity with a certain speed ratio of the shafts to be connected to each other.

From the above, it will be noted that the drive of the transmission according to FIG. 8 is effected directly by pump shaft 137 which in this instance simultaneously represents the transmission input shaft.

Pump shaft 137 is rotatably journalled in bearings 141, 142. Between bearing 141 and control valve 13 there is rotatably connected to shaft 137 a cylinder drum 5 of pump unit 101, so as to be rotatable therewith. On the other side of the control valve there is rotatably mounted a hollow shaft 143 with the cylinder drum of shiftable unit 104 mounted thereon.

Hollow shaft 143 is provided with teeth 144 and clutch teeth 144a. The right-hand end of pump shaft 137 has pressed thereonto a wheel 150 with clutch teeth 150a.

Between the two clutch teeth means 144a, 150a there is journalled a bushing 151 on which, on the outside thereof, during operation of the pump shaft and when looking toward the driving side of the transmission, a steep thread 151a is provided, said thread being a right-hand thread in clockwise direction. Bushing 151 is loosely mounted on pump shaft 137 on which within corresponding milled-out portions within bushing 151 there are provided circular sickle-shaped members 152 which engage the inner diameter of the bushing and act as free-wheel lock in such a way that threaded bushing 151 can, in the direction of rotation of pump shaft 137, rotate on the pump shaft but only at a lower speed. Threaded on threaded bushing 151 is a threaded member 153 which has its outside designed in the form of a cone 153a arranged coaxially with regard to pump shaft 137. Threaded member 153 is by means of a spring 154 interposed between wheel 150 and threaded member 153 held against an abutment in the illustrated position.

Gear 144 of hollow shaft 143 meshes with gear 157 which in turn is rotatably journalled on output shaft 134 and centrally with regard to the output shaft is provided with clutch teeth 145. The ratio of the teeth of gear 144 to gear 147 is in this instance 1:2.

Upon the right-hand end of transmission output shaft 134 there is pressed the clutch wheel 158. Between said wheel 158 and gear 157 there is journalled a bushing 159 upon which, on the outside during the drive of the pump shaft (when looking upon the input side of the transmission in clockwise direction) a left-hand steep thread 159 is provided. This threaded bushing 159 is loosely mounted on the output shaft 137 on which, in corresponding milled-out sections within the bushing, there are provided three circular sickle-shaped members 160 which engage the inner bore of threaded bushing 159 and which act as free-wheel block in such a way that the threaded bushing will be able, in the direction of the output shaft, to turn slower but not faster.

Threaded mounted on threaded bushing 159 is a threaded member 163 which on the outside has a conical surface 163a which is coaxial with the output shaft. Threaded member 163 is held against an abutment in its illustrated position by means of a pressure spring 164 which acts between wheel 158 and threaded member 163.

One coupling sleeve 165 each with inner teeth is longitudinally displaceably mounted on the clutch teeth 145 of wheel 157 and on the coupling teeth 144a of hollow shaft 143. The arrangement is such that the respective left-hand teeth of said sleeve never disengage the teeth of said clutch. Both clutch sleeves 165, in addition to said left-hand teeth also have right-hand clutch teeth which in response to a displacement of the sleeves can be moved rightwardly into the clutch teeth of gears 150, 158 so that the sleeves, when occupying their right-hand positions, interconnect the respective coupling gears having the same axis.

Each clutch sleeve 165 has its outside provided with an annular groove 165a engaged by bolts 166 of an H-shaped two-arm transverse lever 164. This transverse lever is tiltable in bearings 168 of transmission housing 125a and, more specifically, is tiltable about an axis which is perpendicular to the plane passing through transmission shafts 134, 137. Said transverse lever kinematically interconnects the two sleeves in such a way that when one sleeve is in coupling position, the other sleeve is in its disengaged position, whereas in intermediate position between said two extreme positions, the shafts are disengaged from each other.

If a sleeve in one or the other position is displaced beyond said central position, that sleeve which is closer to the respective engaging position will, through the effect of pressure spring 169, be completely pressed into the respective engaging position, pressure spring 169 acting on lever 170 which is perpendicular to the plane of the transverse lever. Spring 169 is arranged between a supporting link linked to the transmission housing, and a supporting joint pivotally connected to the lever.

In the position shown in FIG. 8, spring 169 exerts upon transverse lever 167 a torque which is directed in counterclockwise direction so that the upper sleeve is pressed toward the left and the lower sleeve is pressed toward the right. When the transverse lever 167 occupies a position in a plane which is an image to the plane perpendicular to the shaft axes and passing through the pivot point of the transverse lever, spring 169 would exert upon the transverse lever a moment in clockwise direction.

In the illustrated position, the upper sleeve is in its disengaging position, whereas the lower sleeve is in its engaging position. In this instance, with each sleeve, the inner cone of the upper sleeve which is located between the two clutch teeth is pressed against the conical surface 153a of the threaded member 153 so that between this upper sleeve and the said threaded member there will be be established friction contact. As a result thereof, threaded member 153 and also bushing 151 are turned by sleeve 165 rotating with hollow shaft 153, until pump shaft 137 rotates faster than hollow shaft 143.

The change in the relationship of output speed $n_{II}$ to input speed $n_I$ is in this instance effected, for instance, by varying the stroke volume of unit 104, i.e. by tilting pressure disc 8 of this unit about pivots 122 of the tilting housing 21 pertaining thereto.

This tilting is effected by the hydraulic piston 171 which is longitudinally displaceably mounted in a cylinder 172 connected to the transmission housing, and which through the intervention of a piston rod 173 and a link 173a is connected to a tilting lever 174 mounted on tilting housing 21 of unit 104. The movement of the adjusting piston by the oil under pressure can be effected by a control valve of any standard type, not shown in the drawing.

When with increasing speed ratio $n_{II}/n_I$, the output speed increases, and when in this instance the speed of hollow shaft 143 exceeds the speed of the pump shaft, the threaded bushing 151 will by means of three circular sickle-shaped members 152 be prevented from turning faster than pump shaft 137, so that through the intervention of friction cone 153a, threaded member 153 will be rotated relative to threaded bushing 151 in such a way that said threaded member 153 moves toward the right beyond the above-mentioned intermediate position (while turning the upper clutch sleeve 165) until transverse lever 167 has brought about disengagement of lower clutch sleeve 165. From this point on, the upper sleeve will by the effect of spring 169 upon transverse lever 167 be pressed by said transverse lever completely into clutching position—hollow shaft-pump shaft—so that the friction cones of the sleeve and threaded member 153 disengage each other. Spring 154 finally presses the threaded member 153 with reversed direction of rotation with regard to threaded bushing 151 into its original position which it occupied when the sleeve was disengaged and which is fixed by abutment means so that during a later coupling operation, there will exist some starting conditions in the disengaged position.

Similarly, the reversed operation takes place from the now disengaged lower sleeve 165 when with decreasing output speed $n_{II}$ wheel 157 tends to rotate faster than output shaft 134. The engaging and disengaging operations are thus always caused mutually by the respective disengaged sleeve as soon as the latter tends to run faster than the shaft to be engaged thereby.

It is to be self-understood that this last-mentioned coupling arrangement can also be used in the same manner for the transmission of FIG. 1. Similarly, the coupling arrangement described in connection with the transmission of FIG. 1 may also be applied for the arrangement of FIG. 5.

With the last-described coupling arrangement, it is, however, to be borne in mind that the teeth ratio of wheels 144, 157 has always to be so selected that synchronism of hollow shaft 143 with pump shaft 137 will be obtained with the stroke volume zero of the shiftable unit. In contrast thereto, with the first-mentioned coupling arrangement, it is to be borne in mind that with regard to the tooth ratio of the wheels in the zero stroke position of the shiftable unit, the maximum permissible speed must not be exceeded.

For the sake of completeness and in order to better understand the conditions in connection with the present invention, FIGS. 10 and 11 have plotted over the speed ratio $n_{II}$ for transmissions of FIGS. 1 and 8, the speed $n$, the delivery or absorption volumina V of the individual cylinder drums, i.e. defined in each instance by $n_I$ or $V_{max}$ and the pressure condition $p/p_D$. For the transmission of FIG. 1 the following applies:

The volume delivered by the pumps per time unit plus the volume absorbed by the motor units per time unit must equal zero, thus $$\Sigma V_P n_P + \Sigma V_M n_M = 0$$

when $V_{P1,2}$ stands for the respective pumpstroke volume per revolution.

$V_{M1,2,3}$ stands for the respective motor stroke volume.
$n_{P1,2}$ stands for the respective pump speed.
$n_{M1,2,3}$ stands for the respective motor speed.

With the differential arrangement:

$$n_P = n_I - n_{II} \text{ and } n_{M1,2} = n_{II}$$

$n_I$ standing for the speed of the input shaft.
$n_{II}$ standing for the speed of the output shaft.

Divided by $V_{max}$ and $n_I$ there will be obtained:

$$\left(\frac{V_{P1}}{V_{max}} + \frac{V_{P2}}{V_{max}}\right)\left(1 - \frac{n_{II}}{n_I}\right) + \frac{V_{M1} n_{M1}}{V_{max} n_I} + \frac{V_{M2} n_{M2}}{V_{max} n_I} + \frac{V_{M3} n_{M3}}{V_{max} n_I} = 0$$

For the range:

(1) $0.5 < n_{II}/n_I < 1$, there will be obtained:

$$n_{M1} = n_{M2} = n_{II}, \; n_{M3} = 0$$

and $$V_{P1} = V_{P2} = V_{max}, \; V_{M1} = V_{M2} = \text{variable}, \; V_{M3} = 0$$

consequently $$2(1 - n_{II}/n_I) + 2(V_{M1}/V_{max})(n_{II}/n_I) = 0$$

or $$V_{M1}/V_{max} \; V_{M2}/V_{max} = \frac{1 - n_{II}/n_I}{n_{II}/n_I}$$

Expressed in figures in conformity with $n_{II}/n_I$:

| $n_{II}/n_I$ | $1 - n_{II}/n_I$ | $V_{M1,2}/V_{max}$ |
|---|---|---|
| 1.0 | 0 | 0 |
| 0.9 | 0.1 | −0.111 |
| 0.8 | 0.2 | −0.25 |
| 0.6 | 0.4 | −0.666 |
| 0.5 | 0.5 | −1.0 |

(2) $0.333 < n_{II}/n_I < 0.5$ there will be obtained:

$$n_{M1} = n_{M2} = n_{II}, \; n_{M3} = 0$$

consequently $$(1 + V_{P2}/V_{max})(1 - n_{II}/n_I) - 2(n_{II}/n_I) = 0$$

or $$V_{P2}/V_{max} = \left(2\frac{n_{II}/n_I}{1 - n_{II}/n_I} - 1\right)$$

Expressed in figures and in conformity with $n_{II}/n_I$:

| $n_{II}/n_I$ | $2(n_{II}/n_I)$ | $1-n_{II}/n_I$ | $V_{P2}/V_{max}$ |
|---|---|---|---|
| 0.5 | 1.0 | 0.5 | 1.0 |
| 0.45 | 0.9 | 0.55 | 0.638 |
| 0.40 | 0.8 | 0.6 | 0.333 |
| 0.35 | 0.7 | 0.65 | 0.076 |
| 0.333 | 0.666 | 0.666 | 0.000 |

(3) $0.166 < n_{II}/n_I < 0.333$ there will be obtained:

$$n_{M1} = n_{M2} = n_{II}, \quad n_{M3} = 3n_{II}$$

$V_{P1} = V_{max}, V_{P2} = 0, V_{M1} = V_{M2} = -V_{max}, V_{M3}$ variable so that $$V_{M3}/V_{max} = -\frac{1 - 3n_{II}/n_I}{3n_{II}/n_I}$$

Expressed in figures and in conformity with $n_{II}/n_I$:

| $n_{II}/n_I$ | $3n_{II}/n_I$ | $1-3n_{II}/n_I$ | $V_{M3}/V_{max}$ |
|---|---|---|---|
| 0.333 | 1.0 | 0 | −0 |
| 0.300 | 0.900 | 0.100 | −0.111 |
| 0.250 | 0.750 | 0.250 | −0.333 |
| 0.200 | 0.600 | 0.400 | −0.666 |
| 0.166 | 0.500 | 0.500 | −1.000 |

*Calculation of $p/p_D$.*—For a constant input torque there exists the requirement that the work absorbed by the pumping units per revolution must be constant. The work per revolution absorbed by the pumping units may be expressed as being proportional to the pressure times stroke volume per revolution or $$p(V_{P1} + V_{P2}) = p_D V_{max}$$

expressed differently $$p/p_D = \frac{1}{(V_{P1} + V_{P2})/V_{max}}$$

Within the range $$0.5 < n_{II}/n_I < 1.0, (V_{P1} + V_{P2})/V_{max} = 2.0$$

so that there will be obtained $p/p_D = 0.5$.
Within the range $$0.1666 < n_{II}/n_I < 0.333, V_{P2} = 0, \text{ and } V_{P1} = V_{max}$$

so that within this range $p/p_D = 1.0$.
Within the range $0.333 < n_{II}/n_I < 0.5, V_{P1}/V_{max} = 1.0, V_{P2}/V_{max}$ = variable in conformity with (2) supra, so that $$p/p_D = \frac{1 - n_{II}/n_I}{2n_{II}/n_I}$$

Expressed in figures, the following values are obtained:

| $n_{II}/n_I$ | $1-n_{II}/n_I$ | $2n_{II}/n_I$ | $p/p_D$ |
|---|---|---|---|
| 0.50 | 0.50 | 1.0 | 0.500 |
| 0.45 | 0.55 | 0.9 | 0.611 |
| 0.40 | 0.60 | 0.8 | 0.7500 |
| 0.35 | 0.65 | 0.7 | 0.928 |
| 0.333 | 0.666 | 0.666 | 1.000 |

The course of these values is evident from the graph of FIG. 10.

For the transmission of FIG. 8 corresponding values are ascertained as follows: There is again $$\Sigma V_p n_p + \Sigma V_M n_M = 0$$

In this instance $n_p = n_I$, independently of $n_{II}/n_I$, thus $n_p/n_I = 1.0$ and $n_{M1,2} = n_{II}$, thus $n_{M1,2}/n_I = n_{II}/n_I$.
Thus, for the range:

(1) $0.5 < n_{II}/n_I < 1.0$ with $$V_{P1} = -V_{M1} = -V_{M2} = V_{max}, V_{M3} = 0 \text{ and } V_{P2} = \text{variable}$$

$$V_{P2}/V_{max} = 2n_{II}/n_I - 1.0$$

These values will for $V_{P2}/V_{max}$ indicate a straight line extending from $V_{P2}/V_{max} = 0$ at $n_{II}/n_I = 0.5$ to $V_{P2}/V_{max} = 1.0$ at $n_{II}/n_I / 1.0$ (2) $0.25 < n_{II}/n_I < 0.5$ with $$V_{P1} = -V_{M1} = -V_{M2} = V_{max}, V_{P2} = 0 \text{ and } V_{M3} = \text{variable}$$

and $n_{m3} = 2n_{II}$, thus with $n_{M3}/n_I = 2n_{II}/n_I$ $$V_{M3}/V_{max} = 1 - \frac{1}{2n_{II}/n_I}$$

Expressed in figures:

| $n_{II}/n_I$ | $\frac{1}{2n_{II}/n_I}$ | $V_{M3}/V_{Max}$ |
|---|---|---|
| 0.50 | 1.00 | −0 |
| 0.40 | 1.25 | −0.25 |
| 0.35 | 1.428 | −0.428 |
| 0.30 | 1.666 | −0.666 |
| 0.25 | 2.000 | −1.000 |

For the pressure conditions $p/p_D$, with the same equation of condition as above, there will be obtained in the range $$0.25 < n_{II}/n_I < 0.5, V_{P1}/V_{max} = 1.0, V_{P1}/V_{max} = 0$$

so that $p/p_D = 1.0$.
In the range $0.50 < n_{II}/n_I < 1.00$ is, however, $V_{P1}/V_{max} = 1.0$ and $V_{P2}/V_{max}$ variable, according to the Equation 1 supra.
Consequently $$p/p_D = \frac{1}{2n_{II}/n_I}$$

Expressed in figures:

| $n_{II}/n_I$ | $2n_{II}/n_I$ | $p/p_D$ |
|---|---|---|
| 0.50 | 1.00 | 1.00 |
| 0.60 | 1.20 | 0.833 |
| 0.70 | 1.40 | 0.714 |
| 0.80 | 1.60 | 0.625 |
| 0.90 | 1.80 | 0.555 |
| 1.00 | 2.00 | 0.500 |

The course of these values is shown in FIG. 11.
With a transmission according to FIG. 1, the stroke volume of the shiftable unit reaches the value zero at $n_{II}/n_I = 0.333$. Accordingly, as will be evident from the diagram of FIG. 10, at a pump speed of $n_{II}/n_I = 0.666$, a coupling to motor speed $n_{M3}/n_I = 1$, and vice versa. The motor speed $n_{M3}/n_I = 1$ is possible here only in connection with the employed disc clutch because only in such an instance is it possible to engage the clutch with different speeds. In view of this arrangement, this transmission can, without increasing $p_D$ reach a minimum speed ratio of $n_{II}/n_I = 0.166$, which corresponds to a sixfold torque conversion.

If, however, a shifting device were employed, as is used in connection with the transmission of FIG. 8, the speed of the shiftable unit as motor could be only $2n_{II}$ instead of $3n_{II}$. The change in the coupling would then be effected at $n_{II}/n_I = 0.333$, however, at an equalized speed of $n_{P2}/n_I = n_{M3}/n_I = 0.666$. With such an arrangement, without increasing the pressure over $p/p_D = 1$, only a minimum speed ratio of $n_{II}/n_I = 0.2$ could be obtainable, which would correspond to a fivefold torque conversion.

With the transmission of FIG. 8, the stroke volume zero of the shiftable unit is obtained at $n_{II}/n_{I}=0.5$, at which speed ratio the shifting-over of the shiftable unit from drive shaft to pump shaft or vice versa, takes place. As will be evident from the diagram of FIG. 11, in this instance, synchronous movement prevails between pump shaft and drive shaft of the shiftable unit and also between output shaft and wheel 157 on the latter, said wheel 157 being adapted to be coupled.

With regard to the pressure conditions, it may also be mentioned that the transmission of FIG. 1 within the range of $n_{II}/n_{I}=1$ down to $n_{II}/n_{I}=0.5$ can operate at only half the pressure and requires the full pressure only from $n_{II}/n_{I}=0.333$. In contrast thereto, the full pressure will with the transmission of FIG. 8 already be required from $n_{II}/n_{I}=0.5$ and half the pressure will be obtained only at $n_{II}/n_{I}=1$.

This transmission can, without increasing the pressure beyond $p/p_{D}=1$ reach only a minimum speed ratio of $n_{II}/n_{I}=0.25$, which corresponds to a four-fold torque conversion, which in many instances may be sufficient.

It is, of course, to be understood, that the present invention is, by no means, limited to the particular arrangements shown in the drawings, but also comprises any modifications within the scope of the appended claims.

What is claimed is:

1. A hydrostatic transmission comprising; a housing, input and output shafts extending into said housing, a plurality of fluid displacement units in the housing, means hydraulically interconnecting said units for the transfer of fluid therebetween, said units comprising at least a first unit connected to said input shaft for being driven thereby and serving as a pump, at least a second unit being connected to said output shaft so as to drive the output shaft and serving as a motor, and at least a third unit being adapted for selective connection to said input shaft to serve as a pump or to said output shaft to serve as a motor.

2. A hydrostatic transmission comprising; a housing, input and output shafts extending into said housing, a plurality of fluid displacement units in the housing, means hydraulically interconnecting said units for the transfer of fluid therebetween, said units comprising at least a first unit connected to said input shaft for being driven thereby and serving as a pump, at least a second unit being connected to said output shaft so as to drive the output shaft and serving as a motor, and at least a third unit being adapted for selective connection to said input shaft to serve as a pump or to said output shaft to serve as a motor, said third unit being reversible with respect to the direction of displacement so as to supply fluid in unison with said first unit when serving as a pump and to receive fluid from said first unit when serving as a motor.

3. A hydrostatic transmission comprising; a housing, input and output shafts extending into said housing, a plurality of fluid displacement units in the housing, means hydraulically interconnecting said units for the transfer of fluid therebetween, said units comprising at least a first unit connected to said input shaft for being driven thereby and serving as a pump, at least a second unit being connected to said output shaft so as to drive the output shaft and serving as a motor, and at least a third unit being adapted for selective connection to said input shaft to serve as a pump or to said output shaft to serve as a motor, said third unit being reversible with respect to the direction of displacement so as to supply fluid in unison with said first unit when serving as a pump and to receive fluid from said first unit when serving as a motor, at least said second unit being variable in displacement to adjust the speed thereof with respect to any given rate of supply of fluid thereto.

4. A hydrostatic transmission comprising; a housing, input and output shafts extending into said housing, a plurality of fluid displacement units in the housing, means hydraulically interconnecting said units for the transfer of fluid therebetween, at least one first unit being connected to said input shaft so as to be driven thereby and serving as a pump, at least a second one of said units being connected to said output shaft so as to drive the output shaft and serving as a motor, at least a third one of said units being adapted for selective connection to said input shaft to serve as a pump or to said output shaft to serve as a motor, said third unit including means for varying and reversing the displacement thereof, first clutch means for selectively clutching said third unit to said input shaft, and second clutch means selectively operable for clutching said third unit to said output shaft.

5. A hydrostatic transmission comprising; a housing, input and output shafts extending into said housing, a plurality of fluid displacement units in the housing, means hydraulically interconnecting said units for the transfer of fluid therebetween, at least one first unit being connected to said input shaft so as to be driven thereby and serving as a pump, at least a second one of said units being connected to said output shaft so as to drive the output shaft and serving as a motor, at least a third one of said units being adapted for selective connection to said input shaft to serve as a pump or to said output shaft to serve as a motor, said third unit including means for varying and reversing the displacement thereof, first clutch means for selectively clutching said third unit to said input shaft, and second clutch means selectively operable for clutching said third unit to said output shaft, said transmission including planetary gear means having one element connected to said input shaft, a second element connected to said output shaft and a third element connected to said housing.

6. A hydrostatic transmission comprising; a housing, input and output shafts extending into said housing, a plurality of fluid displacement units in the housing, means hydraulically interconnecting said units for the transfer of fluid therebetween, at least one first unit being connected to said input shaft so as to be driven thereby and serving as a pump, at least a second one of said units being connected to said output shaft so as to drive the output shaft and serving as a motor, at least a third one of said units being adapted for selective connection to said input shaft to serve as a pump or to said output shaft to serve as a motor, said third unit including means for varying and reversing the displacement thereof, first clutch means for selectively clutching said third unit to said input shaft, and second clutch means selectively operable for clutching said third unit to said output shaft, said second unit also being variable in displacement.

7. A hydrostatic transmission comprising; a housing input and output shafts extending into said housing, a plurality of fluid displacement units in the housing, means hydraulically interconnecting said units for the transfer of fluid therebetween, at least one first unit being connected to said input shaft so as to be driven thereby and serving as a pump, at least a second one of said units being connected to said output shaft so as to drive the output shaft and serving as a motor, at least a third one of said units being adapted for selective connection to said input shaft to serve as a pump or to said output shaft to serve as a motor, said third unit including means for varying and reversing the displacement thereof, first clutch means for selectively clutching said third unit to said input shaft, and second clutch means selectively operable for clutching said third unit to said output shaft, said second unit also being variable in displacement, and means for actuating said first and second clutch means including means for disengaging either one thereof when the other thereof is engaged.

8. A hydrostatic transmission comprising; a housing, input and output shafts extending into said housing, a plurality of fluid displacement units in the housing, means hydraulically interconnecting said units for the transfer of fluid therebetween, at least one first unit being connected to said input shaft so as to be driven thereby and serving as a pump, at least a second one of said units being connected to said output shaft so as to drive the output shaft and serving as a motor, at least a third one of said units being adapted for selective connection to said input shaft to serve as a pump or to said output shaft to serve as a motor, said third unit including means for varying and reversing the displacement thereof, first clutch means for selectively clutching said third unit to said input shaft, and second clutch means selectively operable for clutching said third unit to said output shaft, said second unit also being variable in displacement, and means for actuating said first and second clutch means including means for disengaging either one thereof when the other thereof is engaged, said means for actuating said first and second clutch means including means operable in response to the adjustment of the displacement of said third unit through zero for disengaging the engaged one of said clutch means while engaging the disengaged one of said clutch means.

9. A hydrostatic transmission according to claim 7 in which said means for actuating said clutch means includes hydraulic means pertaining to each said clutch means, an auxiliary pump, pressure holding valve means connected with said pump, a control valve connected between the pump and said hydraulic means, and means for operating said control valve simultaneously with the adjustment of the displacement of said third unit.

10. A hydrostatic transmission according to claim 7 in which said means for actuating said clutch means includes hydraulic means pertaining to each thereof, an auxiliary pump, a pressure holding valve connected with said auxiliary pump, means connecting said auxiliary pump with the low pressure side of the means hydraulically interconnecting said units, a control valve connected to said hydraulic means pertaining to said clutch means and means connecting the high pressure side of said means hydraulically interconnecting said units with the inlet of said control valve.

11. A hydrostatic transmission according to claim 10 in which the means connecting said auxiliary pump with the low pressure side of said means hydraulically interconnecting said units comprises check valve means in which the means connecting said means hydraulically interconnecting said units with said control valve also comprises check valve means.

12. A hydrostatic transmission according to claim 7 in which said means for actuating said clutch means includes means responsive to a predetermined difference in speed between said input and output shafts for engaging and disengaging said clutch means.

13. A hydrostatic transmission according to claim 12 in which the said means for actuating said clutch means includes over center spring means to provide for snap action of said clutch means between their engaged and disengaged positions.

14. A hydrostatic transmission comprising; a housing, input and output shafts extending into said housing, a plurality of fluid displacement units in the housing, circuit means hydraulically interconnecting said units for the transfer of fluid therebetween, said units comprising a first pump unit connected to said input shaft, two motor units connected to said output shaft and a fourth unit adapted for selective connection to said input shaft to serve as a pump or to said output shaft to serve as a motor, at least said fourth unit having means for reversibly varying the displacement thereof, a control member moveable for varying the displacement of said fourth unit from maximum delivery from one direction through zero to maximum delivery in the other direction, first clutch means for clutching said fourth unit to said input shaft, second clutch means for clutching said fourth unit to said output shaft, and means operated by said control member when adjusting the displacement of said fourth unit through zero for engaging the disengaged one of said clutch means while simultaneously disengaging the other thereof.

15. A hydrostatic transmission comprising; a housing, input and output shafts extending into said housing, a plurality of fluid displacement units in the housing, circuit means hydraulically interconnecting said units for the transfer of fluid therebetween, said units comprising a first pump unit connected to said input shaft, two motor units connected to said output shaft and a fourth unit adapted for selective connection to said input shaft to serve as a pump or to said output shaft to serve as a motor, at least said fourth unit having means for reversibly varying the displacement thereof, a control member moveable for varying the displacement of said fourth unit from maximum delivery from one direction through zero to maximum delivery in the other direction, first clutch means for clutching said fourth unit to said input shaft, second clutch means for clutching said fourth unit to said output shaft, said clutch means being mechanically interconnected for movement of either one thereof into disengaged position when the other thereof is moved into engaged position and vice versa, and means connected with said input and output shafts sensitive to a predetermined speed differential therebetween as brought about by adjustment of the displacement of said fourth unit for effecting shifting of said clutch means.

References Cited by the Examiner

UNITED STATES PATENTS

| | | | |
|---|---|---|---|
| 3,074,296 | 1/1963 | Ebert | 60—53 |
| 3,123,975 | 3/1964 | Ebert | 60—53 |
| 3,203,185 | 8/1965 | Williams | 60—53 |

EDGAR W. GEOGHEGAN, *Primary Examiner.*